United States Patent
Meyer et al.

(10) Patent No.: US 10,640,106 B2
(45) Date of Patent: May 5, 2020

(54) SPEED CONTROLLING AN ELECTRIC MACHINE OF A HYBRID ELECTRIC VEHICLE

(71) Applicant: Ford Global Technologies, LLC, Dearborn, MI (US)

(72) Inventors: Jason Meyer, Canton, MI (US); Rajit Johri, Canton, MI (US); Jeffrey Allen Doering, Canton, MI (US); Scott James Thompson, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 15/241,995

(22) Filed: Aug. 19, 2016

(65) Prior Publication Data
US 2018/0050687 A1 Feb. 22, 2018

(51) Int. Cl.
| | |
|---|---|
| *B60W 20/40* | (2016.01) |
| *B60W 10/02* | (2006.01) |
| *B60L 15/20* | (2006.01) |
| *B60W 10/06* | (2006.01) |
| *B60W 10/08* | (2006.01) |
| *B60W 20/00* | (2016.01) |
| *B60W 50/00* | (2006.01) |

(52) U.S. Cl.
CPC ......... *B60W 20/40* (2013.01); *B60L 15/2054* (2013.01); *B60W 10/02* (2013.01); *B60W 10/026* (2013.01); *B60W 10/06* (2013.01); *B60W 10/08* (2013.01); *B60W 20/00* (2013.01); *B60W 2050/0008* (2013.01); *B60W 2050/0012* (2013.01); *B60W 2510/0233* (2013.01); *B60W 2510/0241* (2013.01); *B60W 2510/081* (2013.01); *B60W 2540/10* (2013.01); *B60W 2710/021* (2013.01); *B60W 2710/083* (2013.01); *Y02T 10/645* (2013.01); *Y02T 10/72* (2013.01); *Y02T 10/7275* (2013.01)

(58) Field of Classification Search
CPC ... B60L 15/2054; B60W 10/06; B60W 10/08; B60W 10/023; B60W 20/40; B60W 30/18018; B60W 2510/0233; B60W 2710/083
See application file for complete search history.

(56) References Cited

U.S. PATENT DOCUMENTS

| | | | |
|---|---|---|---|
| 5,121,820 A | 6/1992 | Brown et al. | |
| 6,364,807 B1 | 4/2002 | Koneda et al. | |
| 7,070,530 B2 | 7/2006 | Ai et al. | |
| 7,743,678 B2 | 6/2010 | Wittkopp et al. | |

(Continued)

FOREIGN PATENT DOCUMENTS

| | | |
|---|---|---|
| JP | 5287780 B2 | 9/2013 |
| KR | 1020050098681 A | 12/2005 |

*Primary Examiner* — Erin D Bishop
(74) *Attorney, Agent, or Firm* — David Kelley; Brooks Kushman P.C.

(57) ABSTRACT

A hybrid powertrain includes an engine having a crankshaft, and an electric motor having a rotor selectively coupled to the crankshaft via a disconnect clutch. The powertrain further includes a transmission having a torque converter that has an impeller fixed to the rotor. A controller is configured to, in response to the engine starting, generate a torque command for the motor that defines a magnitude that is based on a difference between a target impeller speed and a measured impeller speed.

17 Claims, 7 Drawing Sheets

(56) References Cited

U.S. PATENT DOCUMENTS

| | | |
|---|---|---|
| 7,758,467 B2 | 7/2010 | Ashizawa et al. |
| 7,896,114 B2 | 3/2011 | Colvin et al. |
| 7,909,730 B2 | 3/2011 | Schwarz et al. |
| 8,315,752 B2 | 11/2012 | Kwon et al. |
| 8,571,771 B2 | 10/2013 | Kresse |
| 8,602,939 B2 | 12/2013 | Yamazaki et al. |
| 8,715,136 B1 | 5/2014 | Dai et al. |
| 8,911,324 B2 | 12/2014 | Doering |
| 9,031,722 B2 | 5/2015 | Doering et al. |
| 9,067,594 B2 | 6/2015 | Wang et al. |
| 9,573,579 B2 | 2/2017 | Johri et al. |
| 2002/0170758 A1 | 11/2002 | Shimabukuro et al. |
| 2003/0229429 A1 | 12/2003 | Brown et al. |
| 2006/0089232 A1 | 4/2006 | Kobayashi et al. |
| 2007/0056784 A1 | 3/2007 | Joe et al. |
| 2007/0191181 A1 | 8/2007 | Burns |
| 2008/0119975 A1 | 5/2008 | Yamazaki et al. |
| 2009/0093339 A1 | 4/2009 | Chen |
| 2009/0143950 A1 | 6/2009 | Hasegawa et al. |
| 2009/0194381 A1 | 8/2009 | Samie et al. |
| 2010/0087290 A1 | 4/2010 | Schoenek et al. |
| 2011/0061954 A1 | 3/2011 | Singh et al. |
| 2011/0118915 A1 | 5/2011 | Ortmann et al. |
| 2011/0165992 A1 | 7/2011 | Ueno et al. |
| 2011/0245034 A1* | 10/2011 | Yoshida ............. B60K 6/48 477/8 |
| 2013/0012353 A1 | 1/2013 | Yoshida et al. |
| 2013/0023380 A1 | 1/2013 | Sah |
| 2013/0274969 A1 | 10/2013 | Wang et al. |
| 2013/0291830 A1 | 11/2013 | Doering et al. |
| 2013/0296108 A1 | 11/2013 | Ortmann et al. |
| 2013/0296119 A1 | 11/2013 | Reed |
| 2013/0296123 A1 | 11/2013 | Doering |
| 2013/0297162 A1 | 11/2013 | Dai et al. |
| 2015/0111693 A1 | 4/2015 | Wang et al. |
| 2015/0198243 A1* | 7/2015 | Johri ............. B60W 10/023 701/22 |
| 2015/0211424 A1* | 7/2015 | Nomura ........... F02D 13/0238 123/472 |
| 2015/0274172 A1 | 10/2015 | Yamanaka et al. |
| 2016/0031431 A1 | 2/2016 | Johri et al. |
| 2016/0236670 A1 | 8/2016 | Johri et al. |

\* cited by examiner

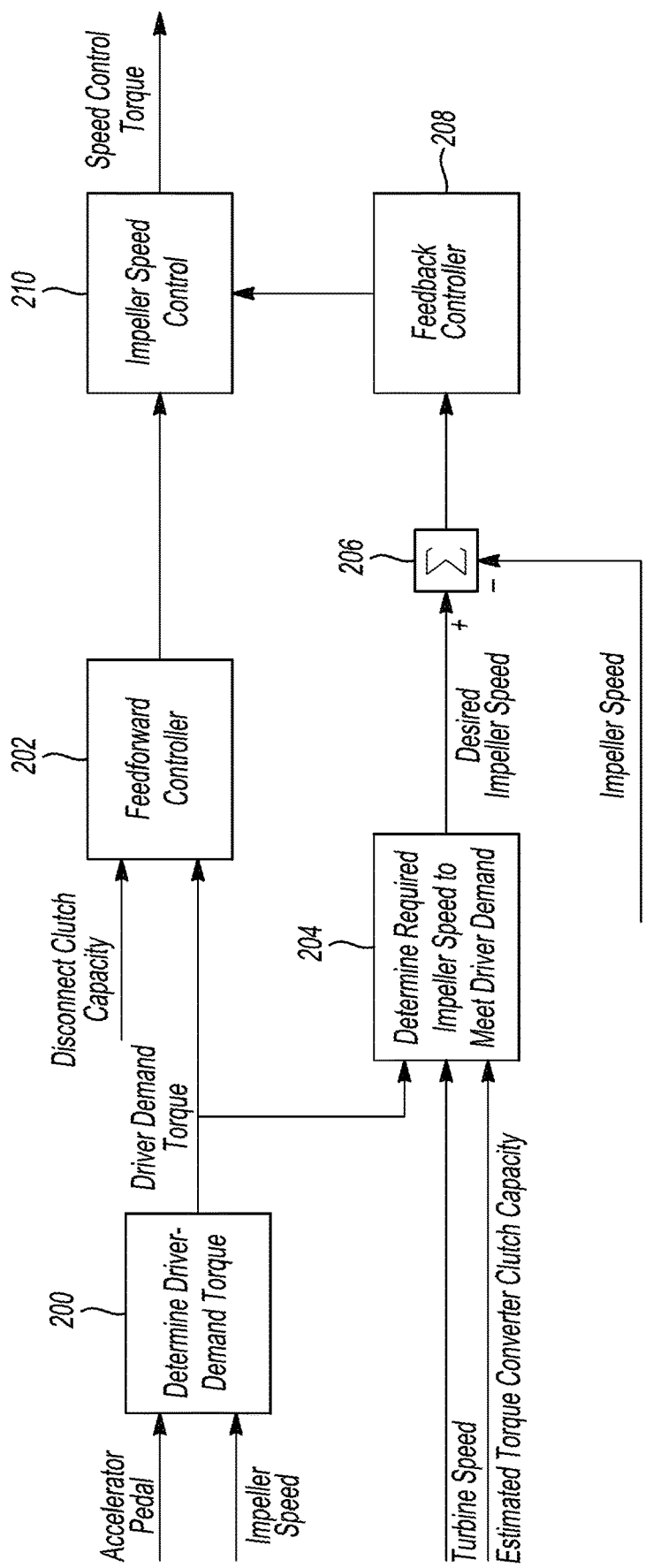

SPEED CONTROLLING AN ELECTRIC MACHINE OF A HYBRID ELECTRIC VEHICLE

TECHNICAL FIELD

The present disclosure relates to hybrid-electric vehicles and more specifically to controlling an electric machine using speed control during certain operating conditions.

BACKGROUND

A hybrid-electric powertrain includes an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a hybrid powertrain includes an engine having a crankshaft, and an electric motor having a rotor selectively coupled to the crankshaft via a disconnect clutch. The powertrain further includes a transmission having a torque converter that has an impeller fixed to the rotor. A controller is configured to, in response to the engine starting, generate a torque command for the motor that defines a magnitude that is based on a difference between a target impeller speed and a measured impeller speed.

According to another embodiment, a vehicle includes an engine having a crankshaft and a transmission. The transmission includes a torque converter having an impeller, and a turbine fixed to a turbine shaft that is driveably connected to driven wheels of the vehicle. The torque converter further has a bypass clutch configured to selectively lock the impeller and turbine relative to each other. An electric machine has a rotor selectively coupled to the crankshaft via a disconnect clutch. The rotor is fixed to the impeller. A speed sensor is disposed within the transmission and is configured to output a speed signal indicating a measured impeller speed. At least one controller of the vehicle is configured to, in response to a change in torque split between the engine and the electric machine, and the bypass clutch being open or slipping, generate a torque command for the electric machine that includes a feedforward component, and a feedback component that is based on an error between a target impeller speed and the measured impeller speed.

According to yet another embodiment, a method of controlling an electric machine of a hybrid powertrain is disclosed. The powertrain includes an engine, a transmission, and a torque converter. The torque converter includes a turbine, an impeller fixed to the electric machine, and a bypass clutch. The method includes generating a command to start the engine. The method further includes, in response to the command to start the engine and the bypass clutch being open or slipping, generating a speed-control torque command for the electric machine that defines a magnitude that is based on a difference between a target impeller speed and a measured impeller speed.

BRIEF DESCRIPTION OF THE DRAWINGS

FIG. 4 is a control diagram illustrating a speed-control algorithm for controlling the electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
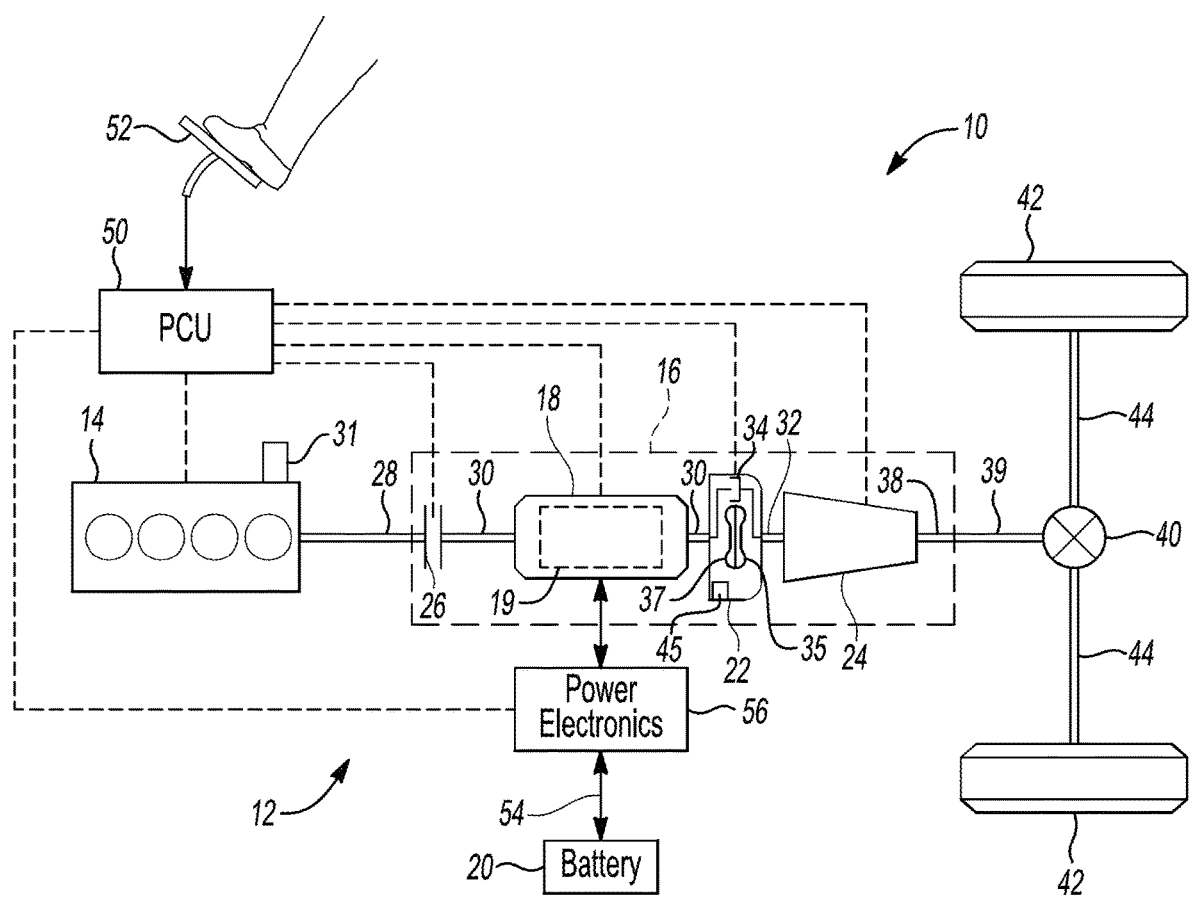
FIG. 1 is a schematic diagram of an example hybrid-electric vehicle.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12 having an engine 14 that drives a transmission 16, which may be referred to as a modular-hybrid transmission (MHT). As will be described in further detail below, a transmission 16 includes an electric machine such as an electric motor/generator (M/G) 18, an associated traction battery 20, a torque converter 22, and a multiple step-ratio automatic transmission, or gearbox 24. The M/G may also be referred to as the motor 18.

The engine 14 and the M/G 18 are both drive sources for the HEV 10. The engine 14 generally represents a power source that may include an internal-combustion engine such as a gasoline, diesel, or natural gas powered engine, or a fuel cell. The engine 14 generates an engine power and corresponding engine torque that is supplied to the M/G 18 when a disconnect clutch (KO clutch) 26 between the engine 14 and the M/G 18 is at least partially engaged. The M/G 18 may be implemented by any one of a plurality of types of electric machines. For example, M/G 18 may be a permanent-magnet-synchronous motor. Power electronics 56 condition direct current (DC) provided by the battery 20 to the requirements of the M/G 18, as will be described below. For example, power electronics may provide three-phase alternating current (AC) to the M/G 18.

When the disconnect clutch 26 is at least partially engaged, power flows from the engine 14 to the M/G 18. Power flow from the M/G 18 to the engine 14 is also possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. The shaft 30 extends through the M/G 18. The rotor 19 of the M/G 18 is fixed on the shaft 30, whereas the engine 14 is selectively driveably connected to the shaft 30 only when the disconnect clutch 26 is at least partially engaged.

A separate starter motor 31 can be selectively engaged with the engine 14 to rotate the engine to allow combustion to begin. The starter motor 31 may be powered by a 12-volt system of the vehicle. Once the engine is started, the starter motor 31 can be disengaged from the engine via, for example, a solenoid that engages/disengages a pinion gear with the ring gear on the flywheel (not shown). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is driveably connected to the torque converter 22 via the shaft 30. For example, the torque-converter housing may be fastened to the shaft 30. The torque converter 22 is therefore driveably connected to the engine 14 when the disconnect clutch 26 is at least partially engaged. Two components are driveably connected if they are connected by a power flow path that constrains their rotational speeds to be directly proportional. The torque converter 22 includes an impeller 35 fixed to the torque-converter housing (and consequently, fixed to the rotor 19) and a turbine 37 fixed to a transmission input shaft 32 that is driveably connected to the driven wheels 42. The torque converter 22 provides a hydraulic coupling between the shaft 30 and the transmission input shaft 32. The torque converter 22 transmits power from the impeller 35 to the turbine 37 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may be provided to, when engaged, frictionally or mechanically couple the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, the disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 32. The gearbox 24 is automatically shifted from one ratio to another based on various vehicle and ambient operating conditions by an associated controller, such as a powertrain-control unit (PCU) 50. The gearbox 24 then provides powertrain output torque to output shaft 38. The output shaft 38 may be connected to a driveline 37 (e.g., a driveshaft and universal joints) that connects the output shaft 38 to the differential 40.

It should be understood that the hydraulically controlled gearbox 24 used with a torque converter 22 is but one example of a gearbox or transmission arrangement; any multiple-ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 38 may be connected to a driveline 37 that connects the output shaft 38 to the differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

While illustrated as one controller, the controller 50 may be part of a larger control system and may be controlled by various other controllers throughout the vehicle 10, such as a vehicle-system controller (VSC) and a high-voltage battery controller (BECM). It is to be understood that the powertrain-control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. For example, the M/G 18 may include a speed sensor 45 configured to output a signal to the controller 50 that is indicative of a speed of the M/G. The controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, traction battery, transmission, or other vehicle systems.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 50 may communicate signals to and/or from the engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air-conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure (if applicable), crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust-gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. The pedal 52 may include a pedal-position sensor. In general, depressing and releasing the pedal 52 causes the pedal sensor to generate an accelerator-pedal-position signal that may be interpreted by the controller 50 as a demand for increased power or decreased power, respectively. Based at least upon input from the pedal, the controller 50 commands torque from the engine 14 and/or the M/G 18. The controller 50 also controls the timing of the gear shifts within the gearbox 24, as well as engagement or disengagement of the disconnect clutch 26 and the torque converter bypass clutch 34. Like the disconnect clutch 26, the bypass clutch 34 can be modulated across a range between the engaged and disengaged positions. This produces a variable slip in the torque converter 22 in addition to the variable slip produced by the hydrodynamic coupling between the impeller and the turbine. Alternatively, the bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as "hybrid mode," "engine-motor mode," or "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter and a DC/DC converter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive (e.g. drive) or negative (e.g. regenerative) torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely an example and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle-control system (which includes the controller 50) determines a driver-demanded torque based on signals from a pedal-position sensor associated with the accelerator pedal 52. This torque may be delivered by placing the powerplants (e.g., engine and motor) in torque control. In torque control, the controller determines a torque split between the engine and the motor and commands that torque from each of the powerplants.

Figure 2:
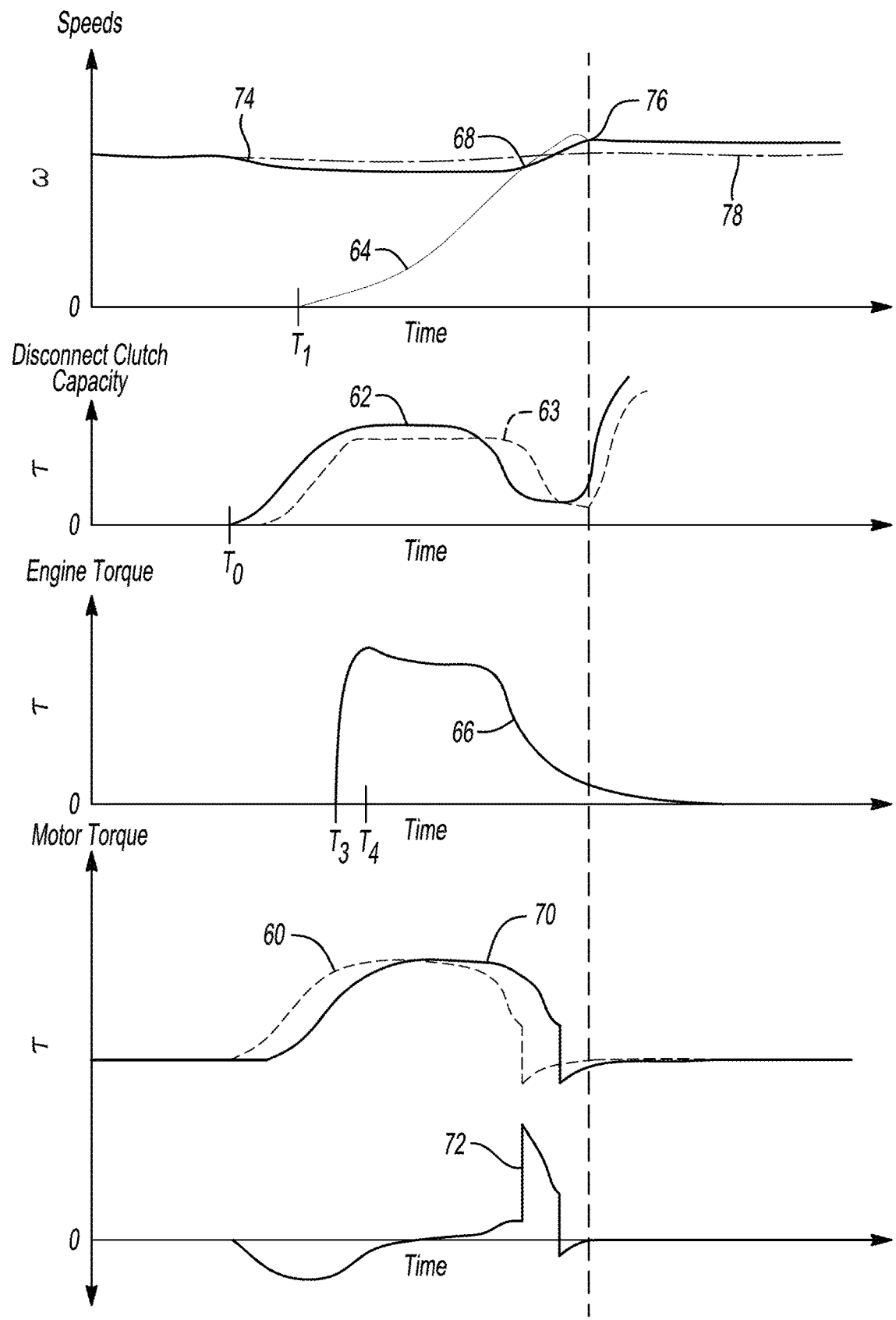
FIG. 2 shows variations of the powertrain parameters during an engine start in which the electric machine is controlled in torque control.

Referring to FIG. 2, an example engine start is shown. In this example, the engine and the motor are in torque control and the engine is started using the disconnect clutch (as opposed to an auxiliary starter motor). In response to an engine start request, the controller estimates the clutch capacity 63 and determines a commanded motor torque 70. During engine start, the commanded motor torque 70 is equal to the driver-demanded torque minus the disconnect clutch torque. The disconnect clutch torque is the disconnect clutch capacity with a negative sign when the disconnect clutch is slipping and the engine speed is lower than the motor speed. The disconnect clutch torque is the disconnect clutch capacity with a positive sign when the disconnect clutch is slipping and the engine speed is higher than the motor speed. At time T0, the disconnect clutch capacity 62 begins to rise and the clutch begins to close. At time T1, the crankshaft of the engine begins to rotate as shown by the engine speed trace 64. At time T3, the engine begins to produce torque as shown by the engine torque trace 66. The engine torque rapidly increases from time T3 to time T4, when the engine is started.

Using torque control, the engine and the motor are controlled to match speeds so that the disconnect clutch can be fully closed to lock the engine and motor. Ideally, the engine and motor would be locked at point 68. But, the engine torque is larger than the actual disconnect clutch capacity 61. The clutch locks when the motor and engine speeds match and the disconnect clutch capacity exceeds the torque produced by the engine. As such, locking of the engine and the motor is delayed to point 76, where engine torque 66 is less than the clutch capacity 62.

The estimated disconnect clutch capacity 63 is not a perfect prediction of the actual clutch capacity 62. Because of this inaccuracy, the system is not able to perfectly deliver the desired impeller torque. The motor torque that is required to perfectly deliver the desired torque is represented with line 60. The difference between the ideal motor torque 60 and the actual motor torque 70 is shown by trace 72. This represents the torque disturbance created when the controller fails to correctly compensate for the disconnect clutch torque. The error 72 causes the measured motor speed 74 to dip below the desired motor speed 78 during engine start. This decrease in motor speed reduces torque transmission through the torque converter and reduces vehicle acceleration. It is to be noted that the desired motor speed 78 is not a target or commanded speed as there is no target motor speed in torque control. The error 72 further causes the motor speed 74 to be higher than the desired speed 78 after the engine and motor are locked. This decrease in motor speed increases torque transmission through the torque converter and increase vehicle acceleration. These changes in acceleration produce powertrain disturbances that are perceivable by the driver.

In vehicles with multiple powerplants, such as vehicle 10, it is important that each powerplant accurately produces the demanded torque. Inaccuracies in the torque can lead to vehicle speed increasing or decreasing without the driver requesting it. Accurately controlling the powerplants using torque control is particularly difficult during transition events where the torque split between the actuators changes, such as engine start because it is difficult to accurately estimate the instantaneous capacity of the disconnect clutch. During engine start, it may be advantageous to utilize speed control of at least one of the actuators to reduce torque delivery errors. For example, the motor 18 may be placed in speed control during engine start. In speed control, the controller may set a target motor speed and measure the speed of the motor. The controller may compare these speeds and output a torque request to the motor based on an error between these speeds.

Speed control provides an inherent robustness to torque delivery errors. In the following example, a torque converter model is used to generate a target motor speed, which allows M/G 18 to be controlled using speed control. Speed control of the M/G can be utilized during any condition where the torque converter clutch is not fully locked (i.e., open or slipping). When the driver applies the accelerator pedal, the vehicle control system determines a driver-demanded torque. As long as the torque-converter capacity is less than this driver-demanded torque, there will be slip across the torque converter. The amount of slip, and thus the desired impeller speed, can be predicted using a model of the torque converter. Because achieving the speed target is equivalent to achieving driver-demanded torque, the M/G can be placed in speed control and track this target. This provides robustness against torque delivery errors. An example algorithm for speed controlling the M/G 18 will be described below in more detail.

Figure 3A:
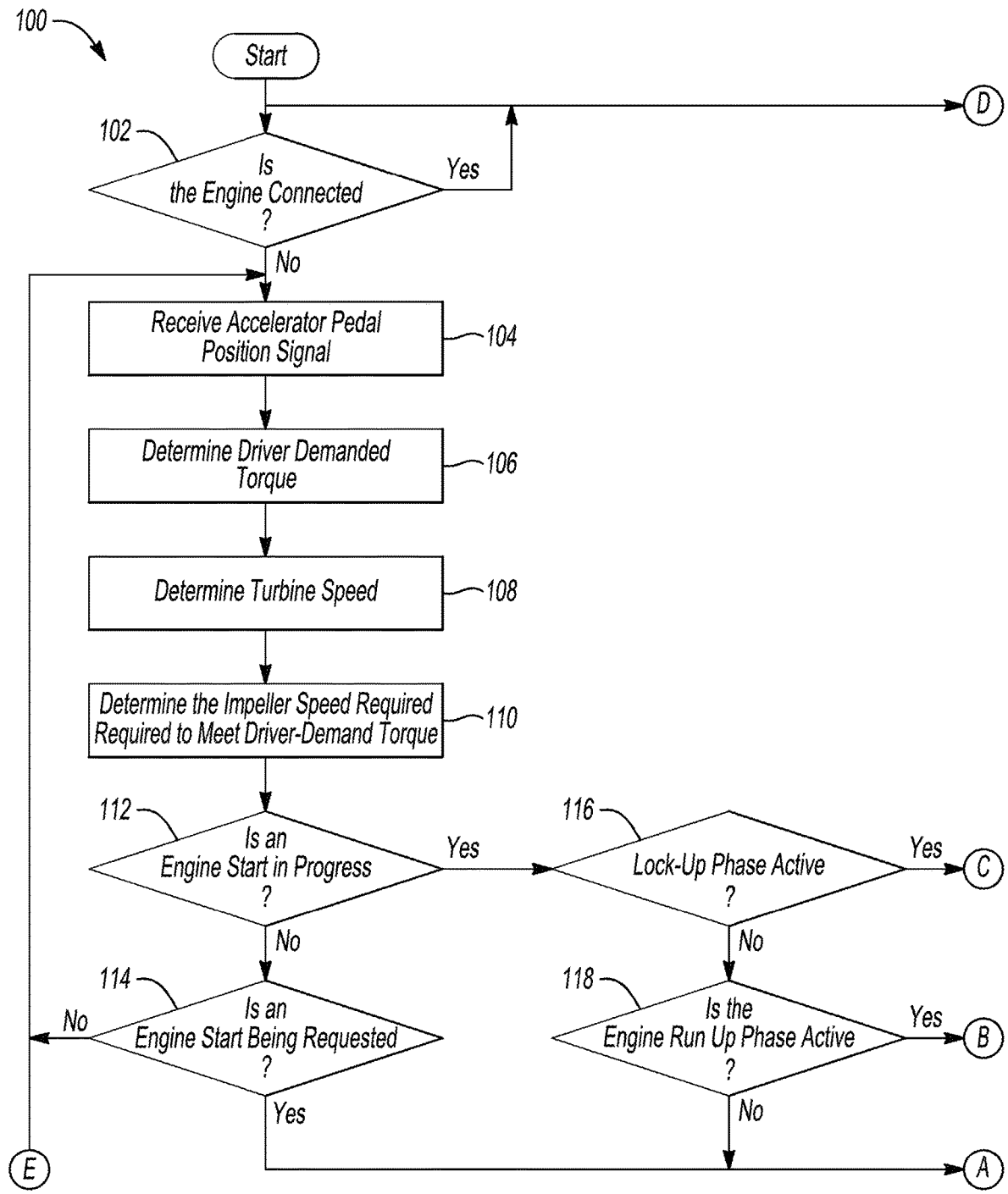
FIGS. 3A to 3C show a flow chart of a control strategy for starting the engine.
Figure 3B:
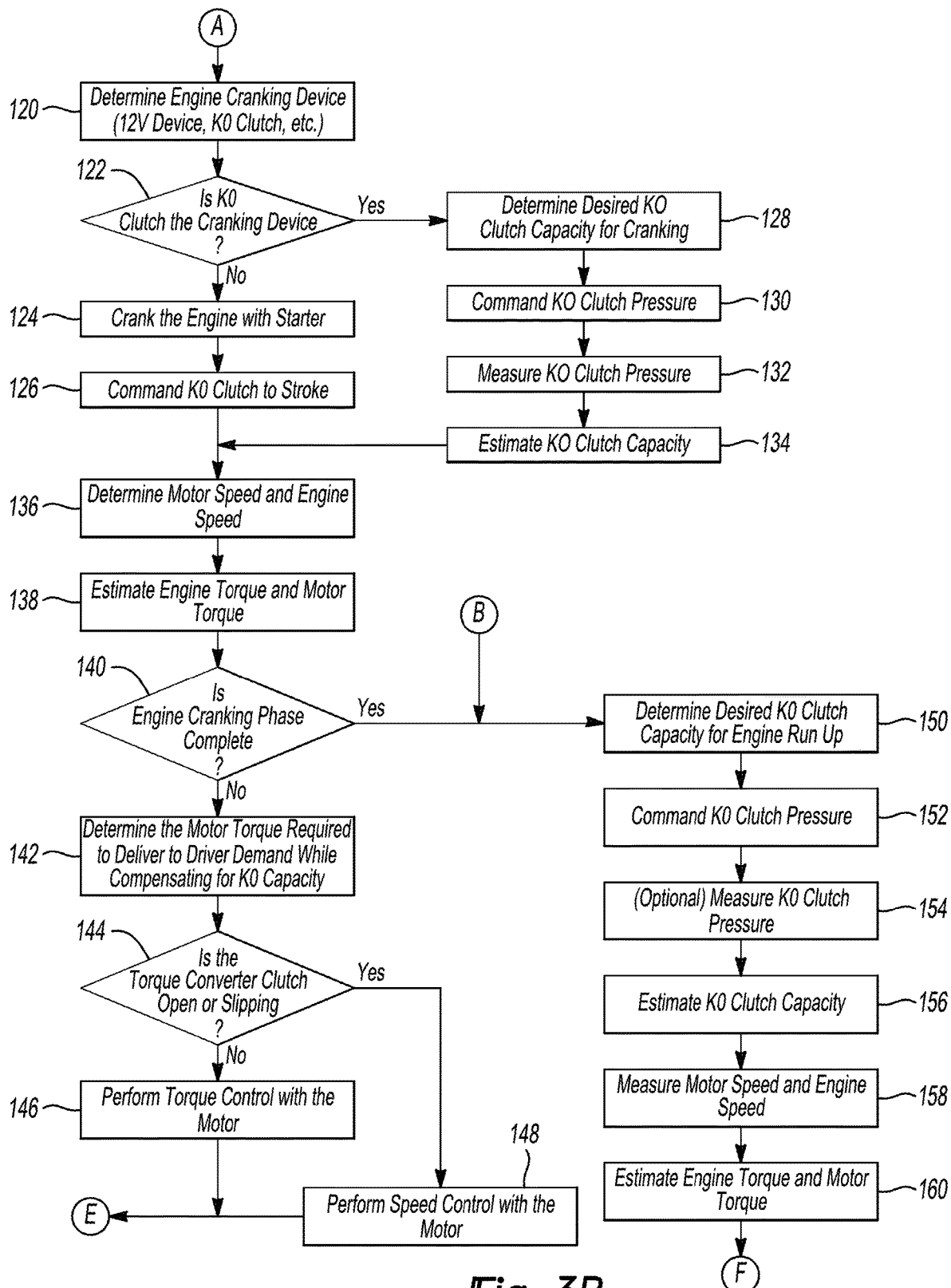
Figure 3C:
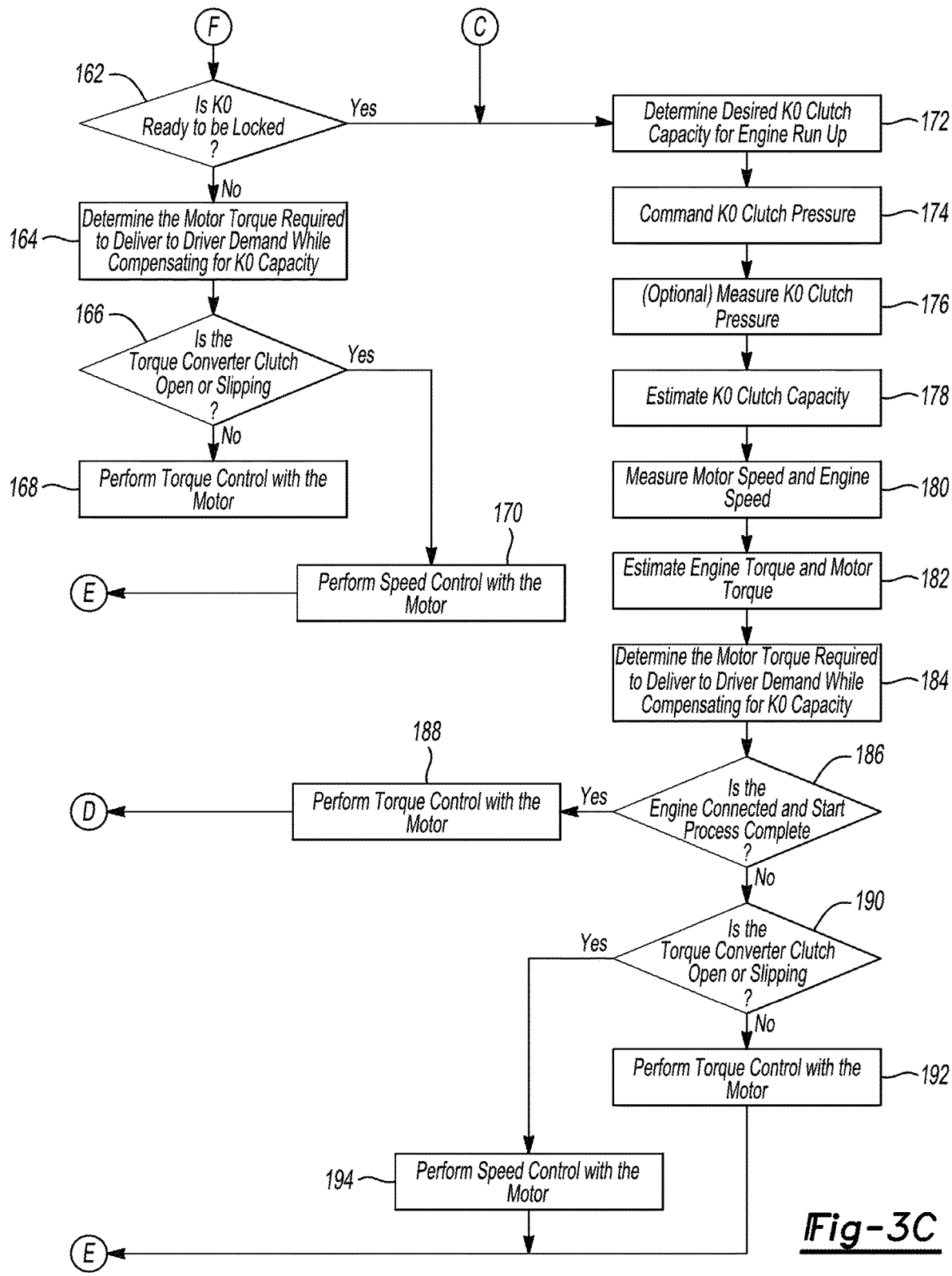

Referring to FIGS. 3A to 3C, a flow chart 100 of an algorithm for starting the engine 14 is shown. The method is implemented using software code contained within the vehicle control module (e.g. controller 50), according to one or more embodiments. In other embodiments, the method 100 is implemented in other vehicle controllers, or distributed amongst multiple vehicle controllers.

The method of controlling engine start in the hybrid electric vehicle may be implemented through a computer algorithm, machine-executable code, or software instructions programmed into a suitable programmable logic device(s) of the vehicle, such as the vehicle control module, the hybrid control module, other controller in communication with vehicle computing system, or a combination thereof. Although the various steps shown in the flowchart diagram 100 appear to occur in a chronological sequence, at least some of the steps may occur in a different order, and some steps may be performed concurrently or not at all.

At operation 102 the controller 50 determines if the engine 14 is connected to the motor 18. If yes, control loops back to the start. If no, the controller receives an accelerator pedal-position signal at operation 104 from a sensor associated with the pedal 52. Using the pedal-position signal, the controller determines a driver-demanded torque at operation 106. At operation 108, the controller determines the speed of the turbine 37, which may be derived from the speed of the vehicle.

At operation 110 the controller determines the impeller speed required to meet driver-demanded torque. The impeller speed may be calculated using equation 1:

$$\tau_{turbine} = K(\omega_I)^2 + \tau_{bypass\ clutch} \qquad \text{Eq. (1)}$$

where, $\tau_{turbine}$ is torque at the turbine, $\tau_{bypass}$ is torque on the torque converter bypass clutch, $\omega_I$ is the impeller speed and K is a f(turbine speed and impeller speed).

Since the desired turbine torque (equal to driver-demanded torque), the torque converter bypass clutch capacity, and the turbine speed are known, the controller can determine an impeller speed that provides the driver-demanded torque using equation 1.

At operation 112, the controller determines if an engine start is in progress. If no, control passes to operation 114 and the controller determines if an engine start is being requested. If no, control loops back to the start. If yes, control passes to operation 120. At operation 120 the controller determines which cranking device is going to be used to start the engine. In the illustrated vehicle 10, the engine 14 can be started with either the dedicated starter 31 or by the motor 18 in conjunction with the disconnect clutch 26. If it is determined at operation 122 that the starter 31 is being used, control passes to operation 124, and if the disconnect clutch is being used, control passes to operation 128. At operation 124 voltage is supplied to the starter 31 to crank the engine 14. In operation 126 the controller commands the disconnect clutch to stroke in order to connect to the crankshaft 28 and the shaft 30. If the disconnect clutch is being used to start the engine, the controller determines the desired disconnect-clutch capacity for cranking the engine at operation 128. At operation 130 the controller commands the disconnect clutch to a pressure calculated to supply the capacity determined in operation 128. In some embodiments, the controller may measure the disconnect clutch pressure at operation 132. This step is optional. At operation 134 the controller estimates the capacity of the disconnect clutch 26. In operation 136 the speeds of the motor and the engine are determined. One or both of these speeds may be directly measured by sensors or may be inferred from other inputs. At operation 138, the controller estimates the motor torque and the engine torque.

At operation 140, the controller determines if the engine-cranking phase is complete. The engine-cranking phase is defined between the start of engine cranking and the first combustion of the engine. The controller may determine the end of the engine-cranking phase by measuring the engine speed and comparing it to a minimum starting speed. If the engine speed exceeds that speed and fuel has been injected and combusted, the engine-cranking phase is complete.

If the engine cranking phase is not complete control passes to operation 142, and the controller determines the motor torque required to deliver the driver-demanded torque while compensating for the engine start.

Accurately estimating the instantaneous disconnect-clutch capacity is difficult and may lead to torque delivery errors. To reduce these torque errors, the commanded motor torque can be adjusted using a feedback loop that utilizes speed control. Equation 1 may be used to speed control the motor when the torque-converter lockup clutch 134 is open or slipping. At operation 144, the controller determines if the torque-converter lockup clutch is open or slipping. If the lockup clutch is locked, control passes to operation 146 and the motor 18 is placed in torque control because speed control is not available. If the clutch is open or slipping, control passes to operation 148 and the motor 18 is placed in speed control.

FIG. 4 illustrates controls for operating the motor 18 in speed control. The controller receives an accelerator pedal-position signal and an impeller-speed signal at box 200, and based on those inputs, determines a driver-demanded torque. The driver-demanded torque is fed into a feedforward controller 202. The feedforward controller 202 also receives a capacity estimate of the disconnect clutch. Based on those inputs, the feedforward controller 202 outputs a feedforward torque. The driver-demanded torque is also feed into box 204. Box 204 also receives the speed of the turbine and an estimated capacity of the torque-converter clutch. Based on these inputs, the controller determines the required impeller speed to meet the driver-demanded torque using equation 1. Box 204 outputs a target impeller-speed signal to comparison box 206. Box 206 receives a measured impeller-speed signal, and compares the target impeller speed to the measured impeller speed to determine an error, which is fed to the feedback controller 208. The feedback controller 208 converts the speed error into a feedback torque and outputs the feedback torque to the impeller-speed controller 210. The impeller-speed controller 210 combines the feedforward torque and the feedback torque and outputs a speed-control torque command to the motor 18 that is based on a difference between a target impeller speed and the measured impeller speed. Speed control provides a robustness to torque delivery errors. Speed control is also robust to errors in the torque-converter model because it is monotonic—an increasing driver-demanded torque request will always result in an increasing target impeller speed. If the impeller speed target fails deliver the driver's expectations, the driver will simply modulate the accelerator pedal until the vehicle produces the desired response.

Referring back to operation 112, if the engine start is in progress control passes operation 116 and the controller determines if a lockup phase of the disconnect clutch 26 is active. The lockup phase occurs when the engine and motor speeds are within a predefined threshold of each other and the disconnect clutch begins to lock the crankshaft 28 and the shaft 30. If no at operation 116, control passes to operation 118 and determines if a run-up phase of the engine is active. The run-up phase occurs between the engine-cranking phase and the lockup phase. If no at operation 118, control passes to operation 120. If yes at operation 118, control passes operation 150.

At operation 150 the controller determines the desired disconnect-clutch capacity for engine run up. At operation 152 the controller commands the disconnect clutch to a pressure calculated to supply the capacity determined in operation 150. In some embodiments, the controller may measure the disconnect clutch pressure at operation 154. This step is optional. In operation 156 the controller estimates the capacity of the disconnect clutch 26. At operations 158 and 160 the speeds and torques of the motor and the engine are determined. At operation 162 the controller determines if the disconnect clutch is ready to be locked. The disconnect clutch is ready to be locked when engine speed is approximates motor speed, and the engine acceleration approximates the motor acceleration.

If the disconnect clutch is not ready to be locked, control passes to operation 164. At operation 164 the controller determines the motor torque required to deliver the driver-demanded torque while compensating for disconnect clutch capacity. At operation 166, the controller determines if the torque-converter lockup clutch is open or slipping. If the lockup clutch is locked, control passes to operation 168 and the motor 18 is placed in torque-control mode. If the clutch is open or slipping, control passes operation 170 and the motor 18 is placed in a speed-control as described in FIG. 4 for example.

If the disconnect clutch is ready to be locked at operation 162, control passes operation 172, and the controller determines a desired capacity to lockup the disconnect clutch during engine run up. At operation 174 the controller commands the disconnect clutch to a pressure calculated to supply the capacity determined in operation 172. In some embodiments, the controller may measure the disconnect clutch pressure at operation 176. In operation 178 the controller estimates the capacity of the disconnect clutch 26. At operations 180 and 182 the speeds and torques of the motor and the engine are determined. At operation 184 the controller determines the motor torque required to deliver the driver-demanded torque while compensating for disconnect clutch capacity.

At operation 186, the controller determines if the engine is connected and the starting process complete. If yes, control passes to operation 188 and the motor is placed in torque control. If no, control passes operation 190, and the controller determines if the torque converter lockup clutch is open or slipping. If the lockup clutch is locked, control passes to operation 192 and the motor 18 is placed in torque-control mode. If the clutch is open or slipping, control passes to operation 194 and the motor 18 is placed in a speed-control mode.

Figure 5:
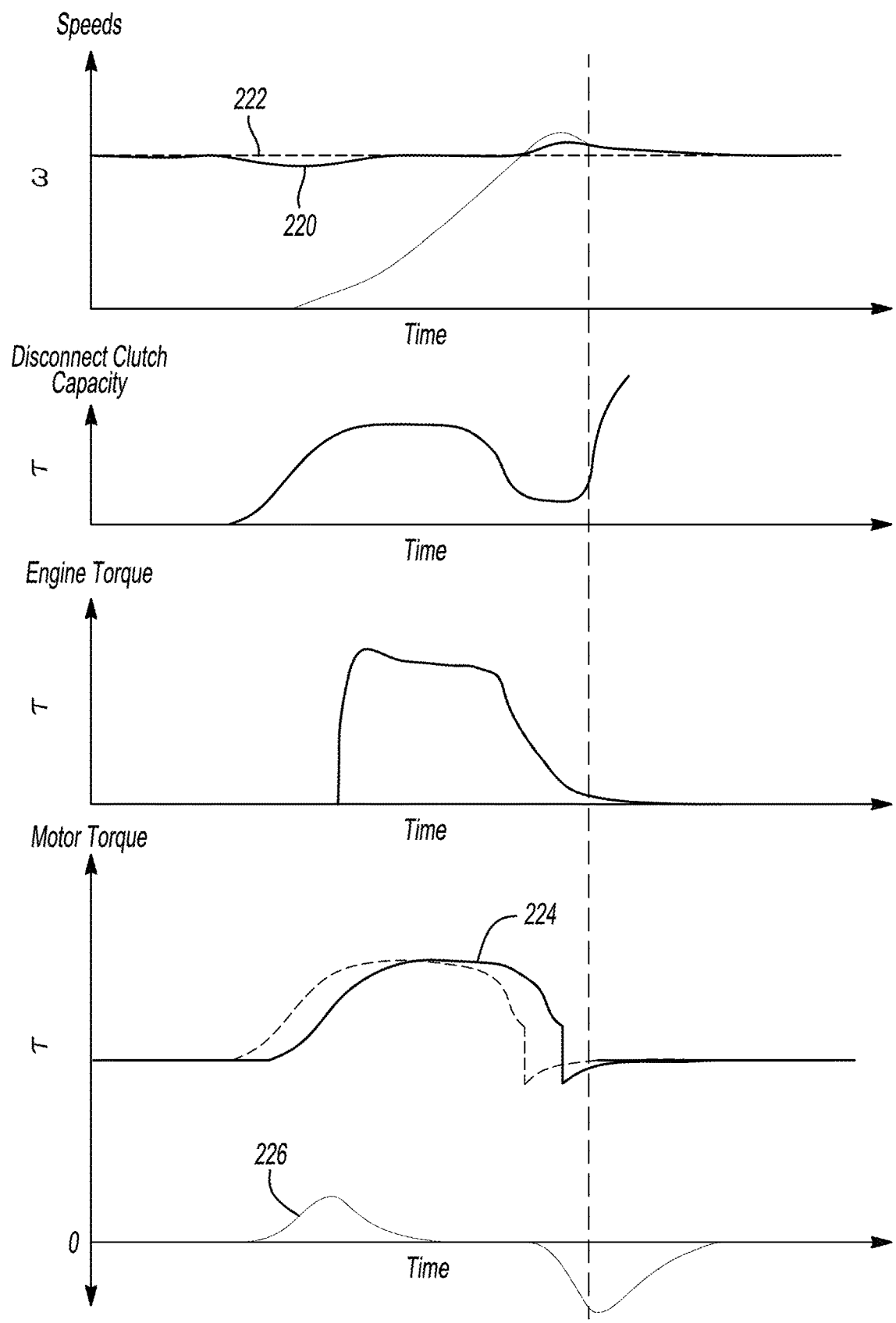
FIG. 5 shows variations of the powertrain parameters during an engine start in which the electric machine is controlled in speed control.

Referring to FIG. 5, an example engine start is shown. In this example, the engine is in torque control, the motor is in speed control, and the engine is being started using the disconnect clutch. It is to be understood, however, that the teachings of this disclosure are equally applicable to engine starts using the auxiliary starter 31. The example engine start of FIG. 5 utilizes the algorithm of FIGS. 3A-3C. Comparing FIGS. 2 (torque control) and 5 (speed control), the advantages of speed controlling the M/G 18 become apparent. The measured motor speed 220 follows the target motor speed 222 more closely than the measured motor speed 74 follows the desired motor speed 78 in FIG. 2. This produces smoother vehicle acceleration and less jerkiness. Using speed control (as described in FIG. 4), the controller may command a feedforward torque command 224 and a feedback torque command 226. The feedback torque command is based on a difference between the target impeller speed and the measured impeller speed. By adjusting the motor torque according to impeller speed, the measured motor speed 220 can be made to follow the target motor speed 222 more closely than using torque control.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hybrid powertrain comprising:
   an engine having a crankshaft;
   an electric motor including a rotor selectively coupled to the crankshaft via a disconnect clutch;
   a transmission including a torque converter having an impeller fixed to the rotor and a turbine; and
   a controller configured to, in response to the engine starting, generate a torque command for the motor that defines a magnitude that is based on a difference between a target impeller speed, that is based on a measured speed of the turbine, and a measured impeller speed.

2. The hybrid powertrain of claim 1, wherein the torque converter further includes a bypass clutch configured to selectively lock the impeller and the turbine relative to each other.

3. The hybrid powertrain of claim 2, wherein the controller is further configured to generate the torque command in response to the bypass clutch being open or slipping.

4. The hybrid powertrain of claim 1, wherein the torque command further includes a feedforward component, and a feedback component that is based on the difference between the target impeller speed and the measured impeller speed.

5. The hybrid powertrain of claim 1, wherein the magnitude increases in response to the difference between the target impeller speed and the measured impeller speed increasing.

6. The hybrid powertrain of claim 5, wherein the magnitude decreases in response to the difference between the commanded impeller speed and the measured impeller speed decreasing.

7. The hybrid powertrain of claim 1, wherein the controller is further configured to command the starting of the engine.

8. The hybrid powertrain of claim 1 further comprising a speed sensor disposed within the electric machine and configured to output a speed signal indicating the measured impeller speed.

9. A vehicle comprising:

an engine including a crankshaft;

a transmission including a torque converter having an impeller, and a turbine fixed to a turbine shaft that is driveably connected to driven wheels of the vehicle, wherein the torque converter further includes a bypass clutch configured to selectively lock the impeller and turbine relative to each other;

an electric machine including a rotor selectively coupled to the crankshaft via a disconnect clutch and fixed to the impeller;

a speed sensor disposed within the transmission and configured to output a speed signal indicating a measured impeller speed; and at least one controller configured to, in response to a change in torque split between the engine and the electric machine, and the bypass clutch being open or slipping, generate a torque command for the electric machine that includes a feedforward component, and a feedback component that is based on an error between a target impeller speed and the measured impeller speed, wherein the target impeller speed is based on a measured speed of the turbine.

10. The vehicle of claim 9, wherein the change in torque split includes starting of the engine.

11. The vehicle of claim 10, wherein the controller is further programmed to command closing of the disconnect clutch in response to a request to start the engine.

12. The vehicle of claim 9, wherein the feedforward component is based on a capacity of the disconnect clutch.

13. The vehicle of claim 9, wherein the feedforward component is further based on a pedal position of an accelerator pedal of the vehicle.

14. The vehicle of claim 9, wherein a magnitude of the feedback component increases in response to the error increasing.

15. A method of controlling an electric machine of a hybrid powertrain that includes an engine, a transmission, and a torque converter having a turbine, an impeller fixed to the electric machine, and a bypass clutch, the method comprising:

generating a command to start the engine; and in response to the command to start the engine and the bypass clutch being open or slipping, generating a speed-control torque command for the electric machine that defines a magnitude that is based on a difference between a target impeller speed, that is based on a measured speed of the turbine, and a measured impeller speed.

16. The method of claim 15 further comprising, in response to completion of the engine starting, generating a torque-control torque command for the electric machine that defines a magnitude that is based on driver-demanded torque.

17. The method of claim 15 further comprising, in response to the bypass clutch being closed, generating a torque-control torque command for the electric machine that defines a magnitude that is based on driver-demanded torque.

* * * * *